United States Patent
Abdul-Bari et al.

(10) Patent No.: US 12,486,024 B2
(45) Date of Patent: Dec. 2, 2025

(54) TRIMMABLE HORIZONTAL STABILISATION ACTUATOR

(71) Applicant: Goodrich Actuation Systems SAS, Vernon (FR)

(72) Inventors: Anh-Vu Abdul-Bari, Franconville (FR); Maxime Julien Florent Serrand, Lyons (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 1 day.

(21) Appl. No.: 18/538,235

(22) Filed: Dec. 13, 2023

(65) Prior Publication Data
US 2024/0199198 A1    Jun. 20, 2024

(30) Foreign Application Priority Data

Dec. 16, 2022  (EP) .................................... 22306906

(51) Int. Cl.
*B64C 13/08* (2006.01)
*B64C 13/50* (2006.01)

(52) U.S. Cl.
CPC ............ *B64C 13/08* (2013.01); *B64C 13/503* (2013.01)

(58) Field of Classification Search
CPC .............................. B64C 13/08; B64C 13/503
See application file for complete search history.

(56) References Cited

U.S. PATENT DOCUMENTS

| | | | |
|---|---|---|---|
| 8,072,172 B2 | 12/2011 | Hanlon et al. | |
| 10,663,041 B2 | 5/2020 | Veilleux, Jr. et al. | |
| 11,253,057 B2 | 2/2022 | Windhaber | |
| 11,273,904 B2 | 3/2022 | Dussart et al. | |
| 11,454,305 B1* | 9/2022 | Liu | F16H 25/205 |
| 2020/0056686 A1* | 2/2020 | Veilleux, Jr. | H02K 7/06 |
| 2022/0185448 A1 | 6/2022 | Rozeboom et al. | |

FOREIGN PATENT DOCUMENTS

| | | |
|---|---|---|
| EP | 3611403 A1 | 2/2020 |
| EP | 3677503 A2 | 7/2020 |
| EP | 3677503 A3 | 9/2020 |

OTHER PUBLICATIONS

Dumas, et al. "Design and comparison of two multi-disc permanent magnet motors for aeronautical application", Electrical Machines (ICEM), 2012 XXth International Conference on, IEEE, Sep. 2, 2012, pp. 647-652.
European Search Report for Application No. 22306906.3, mailed May 12, 2023, 9 pages.
Sayed, et al. "Review of Electric Machines in More-/Hybrid /Turbo-Electric Aircraft", IEEE Transactions on Transportation Electrification, vol. 7, No. 4, Dec. 2021, pp. 2976-3005.

* cited by examiner

*Primary Examiner* — Rodney A Bonnette
(74) *Attorney, Agent, or Firm* — CANTOR COLBURN LLP

(57) ABSTRACT

A linear actuator. The linear actuator includes a screw shaft. The linear actuator also includes: a nut assembly mounted to the screw shaft to move linearly along the screw shaft as the screw shaft is rotated; and a motor to rotate the screw shaft. The motor is an axial motor.

7 Claims, 2 Drawing Sheets

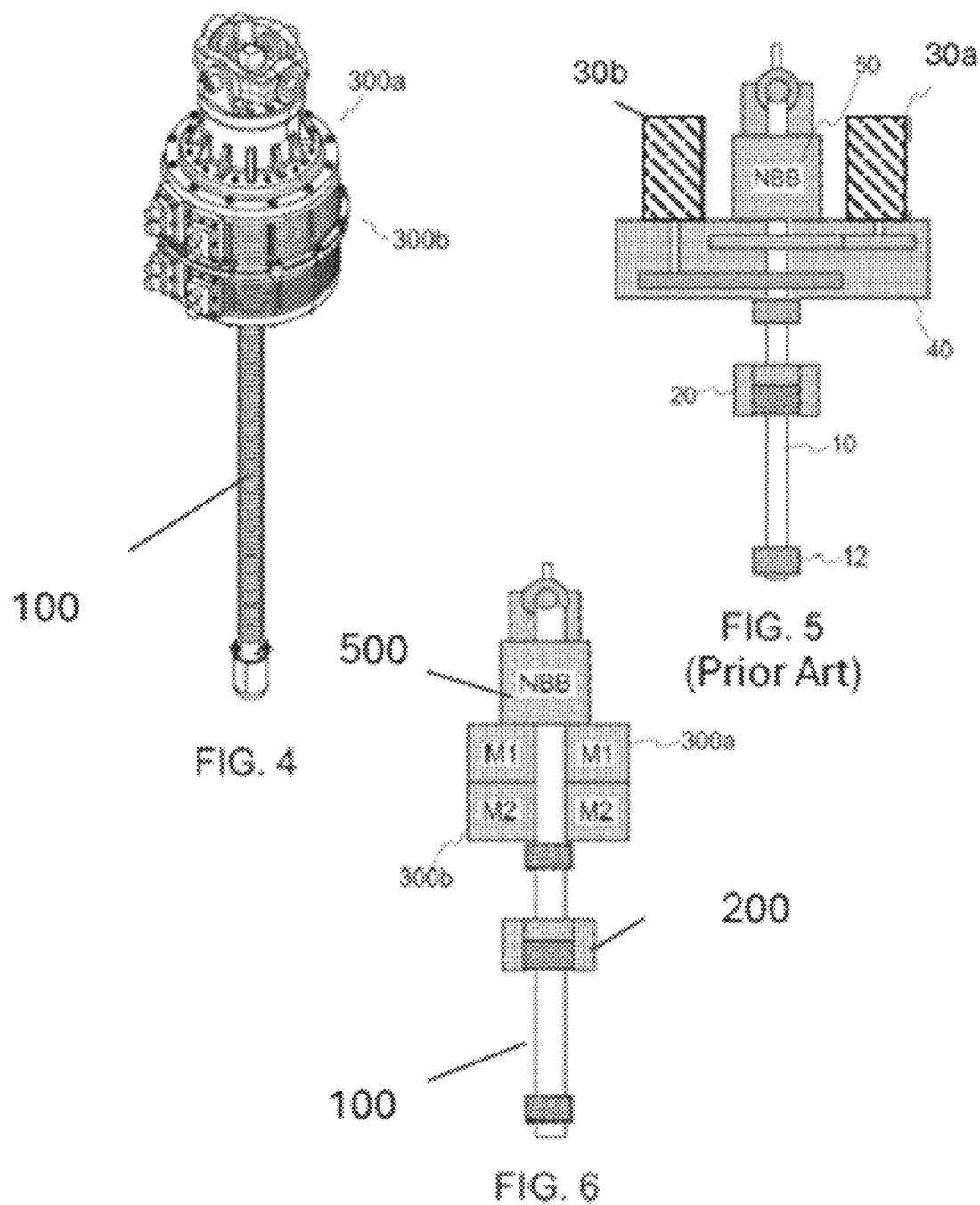

TRIMMABLE HORIZONTAL STABILISATION ACTUATOR

CROSS REFERENCE TO RELATED APPLICATIONS

This application claims priority to European Patent Application No. 22306906.3 filed Dec. 16, 2022, the entire contents of which is incorporated herein by reference.

TECHNICAL FIELD

The present disclosure relates to a new design for a flight actuator such as a trimmable horizontal stabiliser actuator.

BACKGROUND

A horizontal stabiliser is an aircraft component that stabilises the airframe during flight. Typically, they are found at the rear of the fuselage, and incorporate a moveable surface for adjustment in response to trim signals from the pilot or the flight control computer. The moveable surfaces are controlled by an actuator, known as a trimmable horizontal stabiliser actuator ("THSA"). This is controlled by a hydraulic and/or electric motor that is connected to the aircraft fuselage.

The THSA comprises a number of moving components, including a rotating screw shaft, rotation of which is caused by the hydraulic and/or electric motors, via a gear system. This rotating screw shaft causes axial movement of a nut, which in turn drives the moveable surface of the horizontal stabiliser.

No-back brakes are commonly used in screw actuators like this to prevent feedback forces generated by loading the nut of the actuator, from feeding back into the actuator's motor. When a nut of a screw actuator is loaded by an external force (i.e. forces other than that from motor driving the screw shaft, such as forces created through air flow on a stabiliser) the interaction of the nut with the screw shaft will tend to rotate the screw shaft, as the nut tries to translate along the screw shaft in the direction of the external force. A no-back brake may be provided on the screw shaft to prevent or at least minimise rotation of the screw shaft induced in this manner.

Typically, the motor driving the screw shaft is a radial flux motor. Radial flux motors are high speed, low torque motors. To provide the required high torque to move the flight control surface, the THSA includes gears to allow for torque summing.

Although such actuators have proven effective and reliable, the need for large motors and gear systems results in a relatively large, bulky and heavy actuator requiring assembly and maintenance of a relatively large number of parts. Weight and footprint of components as well as assembly and maintenance time are important factors in the aerospace industry, since extra weight on an aircraft results in increased fuel consumption and down time for assembly and maintenance results in high costs. There is a desire to reduce the size and weight, and assembly and maintenance time, of aircraft parts without compromising reliability and, therefore, safety.

SUMMARY

Accordingly, the disclosure provides a linear actuator comprising: a screw shaft; a nut assembly mounted to the screw shaft to move linearly along the screw shaft as the screw shaft is rotated; and a motor to rotate the screw shaft, wherein the motor is an axial flux motor.

In addition to one or more of the features described above, or as an alternative to any of the foregoing embodiments, the actuator can include a no-back brake to prevent back-rotation of the motor.

In addition to one or more of the features described above, or as an alternative to any of the foregoing embodiments, the actuator can include a second motor to provide redundancy for the motor.

In addition to one or more of the features described above, or as an alternative to any of the foregoing embodiments the motor is a single, fault tolerant axial flux motor.

In addition to one or more of the features described above, or as an alternative to any of the foregoing embodiments, the actuator can include a motor position sensor.

In addition to one or more of the features described above, or as an alternative to any of the foregoing embodiments, the actuator can include means for connecting the screw shaft to an aircraft part to be moved by the linear actuator.

In addition to one or more of the features described above, or as an alternative to any of the foregoing embodiments, the actuator can be a trimmable horizontal stabilisation actuator, THSA, of an aircraft.

Also disclosed is an aircraft having a THSA according to any prior embodiment. The THSA can control movement of the flight control part (e.g., a horizontal stabilizer) of an aircraft.

BRIEF DESCRIPTION OF THE DRAWINGS

Examples of an actuator according to the disclosure will be described with reference to the drawings. It should be noted that these are examples only and variations are possible within the scope of the claims.

FIG. 4 shows an actuator according to the present disclosure.

FIG. 5 is a schematic view of a THSA as known in the art.

FIG. 6 is a schematic view of an actuator according to the disclosure.

DETAILED DESCRIPTION

Figure 1:
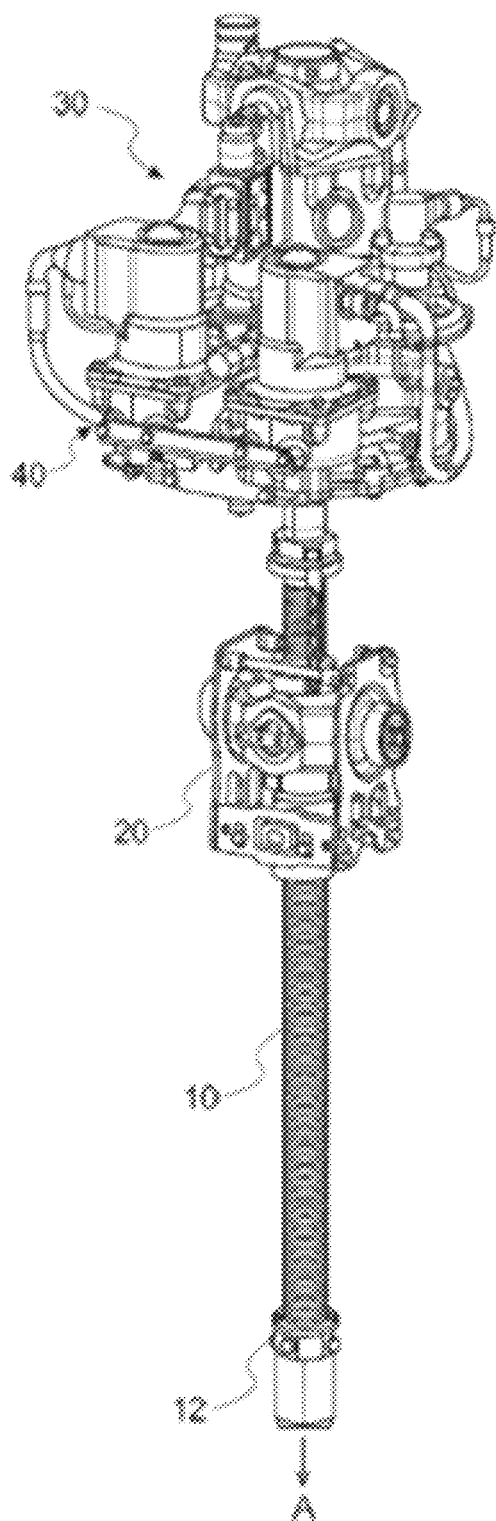
FIG. 1 shows a standard THSA.

With reference to FIG. 1, a typical known flight control actuator of the trimmable horizontal stabiliser actuator (THSA) type includes a primary load path with a hollow screw 10 which is connected, in use, to the aircraft. The THSA links the aircraft structure to the stabilizer through e.g. upper and lower gimbals. The primary load path further includes a nut assembly 20 mounted on the screw 10. The nut assembly 20 is connected, in use, to the stabiliser of the aircraft. A secondary load path is typically provided by means of a tie bar (not shown) which is within the screw 10 and is connected to the structure of the aircraft. The THSA and the load paths through the screw are known and will not be described further. The screw 10 is rotationally driven by means of a radial flux motor 30 mounted to the screw 10. The screw 10 may be a ballscrew such that movement of said nut assembly 20 is caused due to the presence of balls (not shown) between the nut assembly 20 and the screw shaft 10. The screw shaft 10 is rotated by means of one or two motors 30 that drive a reduction gear assembly 40, which gears cause said screw shaft 10 to rotate. Upon rotation of the screw shaft 10, the nut 20 moves along the screw shaft.

Figure 2:
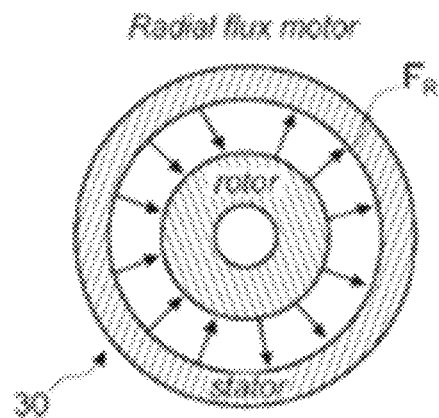
FIG. 2 shows, schematically, the flux direction of a radial flux motor such as used in an actuator like that shown in FIG. 1.

The screw 10 defines an axis A along its length from the end connected 12 to the aircraft and the opposite end to which the motor 30 is attached via the gears. The radial motor 30 is mounted such that the flux, which is generated radially between the motor stator and the motor rotor, as indicated by arrows FR in FIG. 2, is perpendicular to the screw axis A.

As is known, a radial flux motor includes a rotor and a stator arranged coaxially. Permanent magnets on the stator or rotor interact with coils on the other of the rotor or stator to generate a radial flux FR as seen in FIG. 2. The flux is therefore generated perpendicular to the axis of rotation A.

Because a radial flux motor is a high speed, low torque motor, and because the trim or other surface to be moved by the actuator requires a high torque and low speed, gears 40 are required to increase the torque generated by the motor 30 to a higher torque.

Typically, a THSA requires two such radial flux motors to provide redundancy (torque summing).

An actuator of this type also typically includes a no-back brake mechanism 50 as mentioned above.

The arrangement of the radial flux motors and the gear system 40, mounted around the screw 10, provides a relatively bulky design.

Figure 3:
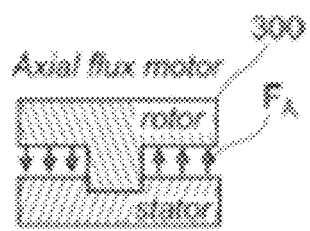
FIG. 3 shows, schematically, the flux direction of an axial flux motor such as used in an actuator like that shown in FIG. 4.

In order to provide a smaller, simpler actuator, according to the present invention, the radial flux motor and gears are replaced by an axial flux motor 300 as shown in FIGS. 3, 4 and 6. The geometry of an axial flux motor is different from that of a radial flux motor and the flux is generated parallel to the axis of rotation (as shown by the arrows FA in FIG. 3). Although axial flux motors per se are known, they have not previously been used in commercial applications due to complexity and cost of manufacturing. In recent times, however, advances in materials such as soft magnetic composite (SMC) materials has made it more feasible to use axial flux motors in practical designs.

In an axial flux motor, the rotor is axially spaced from the stator. Having the rotor on the motor outer diameter means that the motor can produce greater torque for the same or smaller overall motor footprint. The axial flux motor used in the actuator of this disclosure is mounted to the screw shaft 100 such that the flux generated by the motor is parallel to the screw shaft axis A.

As the axial flux motor has a greater torque, it can directly drive the screw shaft 100 without the need for gears. This together with the relatively flat profile of the axial motor reduces the overall footprint compared to the radial motor arrangement, as can be seen from FIG. 4 as well as FIG. 6 when compared to FIG. 5.

The operation of the nut 200 on the screw shaft 100 is the same as for the conventional THSA and will not be described further.

As with the known designs, the actuator of the disclosure may include motor position sensors. In the present case, these may also detect the ballscrew position thus avoiding the need for resolvers.

A no-back brake NBB 500 may also be provided as in the known system.

The example shown in FIG. 6 has two axial motors 300a, 300b for redundancy in the event of failure of one of the motors. In an alternative embodiment (not shown), a single fault tolerant axial motor may be used thus decreasing the footprint further.

The use of an axial motor instead of a radial motor plus gears results in an actuator with reduced weight, envelope and complexity.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A trimmable horizontal stabilization actuator of an aircraft, the trimmable horizontal stabilization actuator comprising:
   a linear actuator, the linear actuator comprising:
   a screw shaft having a shaft axis (A);
   a nut assembly mounted to the screw shaft to move linearly along the screw shaft as the screw shaft is rotated; and
   a motor to rotate the screw shaft without a gear, wherein the motor is an axial flux motor, wherein the axial flux motor is mounted to the screw shaft such that flux generated by the axial flux motor is parallel to the shaft axis (A).

2. The trimmable horizontal stabilization actuator of claim 1, wherein the linear actuator further includes:
   a no-back brake to prevent back-rotation of the axial motor.

3. The trimmable horizontal stabilization actuator of claim 1, wherein the linear actuator further includes:
   a second axial motor to provide redundancy for the motor.

4. The trimmable horizontal stabilization actuator of claim 1, wherein the motor is a single, fault tolerant axial flux motor.

5. The trimmable horizontal stabilization actuator of claim 1, wherein the linear actuator further includes:
   means for connecting the screw shaft to an aircraft part.

6. An aircraft comprising:
   a flight control part;

a trimmable horizontal stabilization actuator as claimed in claim 1, for controlling movement of the flight control part.

7. The aircraft of claim 6, wherein the flight control part is a horizontal stabilizer.

\* \* \* \* \*